Nov. 21, 1967     D. W. ROLLINS ET AL     3,353,505
COLLAPSIBLE SUPPORT

Filed March 6, 1967     4 Sheets-Sheet 1

INVENTORS.
DALLAS W. ROLLINS
CARL E. BECKER

Eugene N. Riddle

ATTORNEY

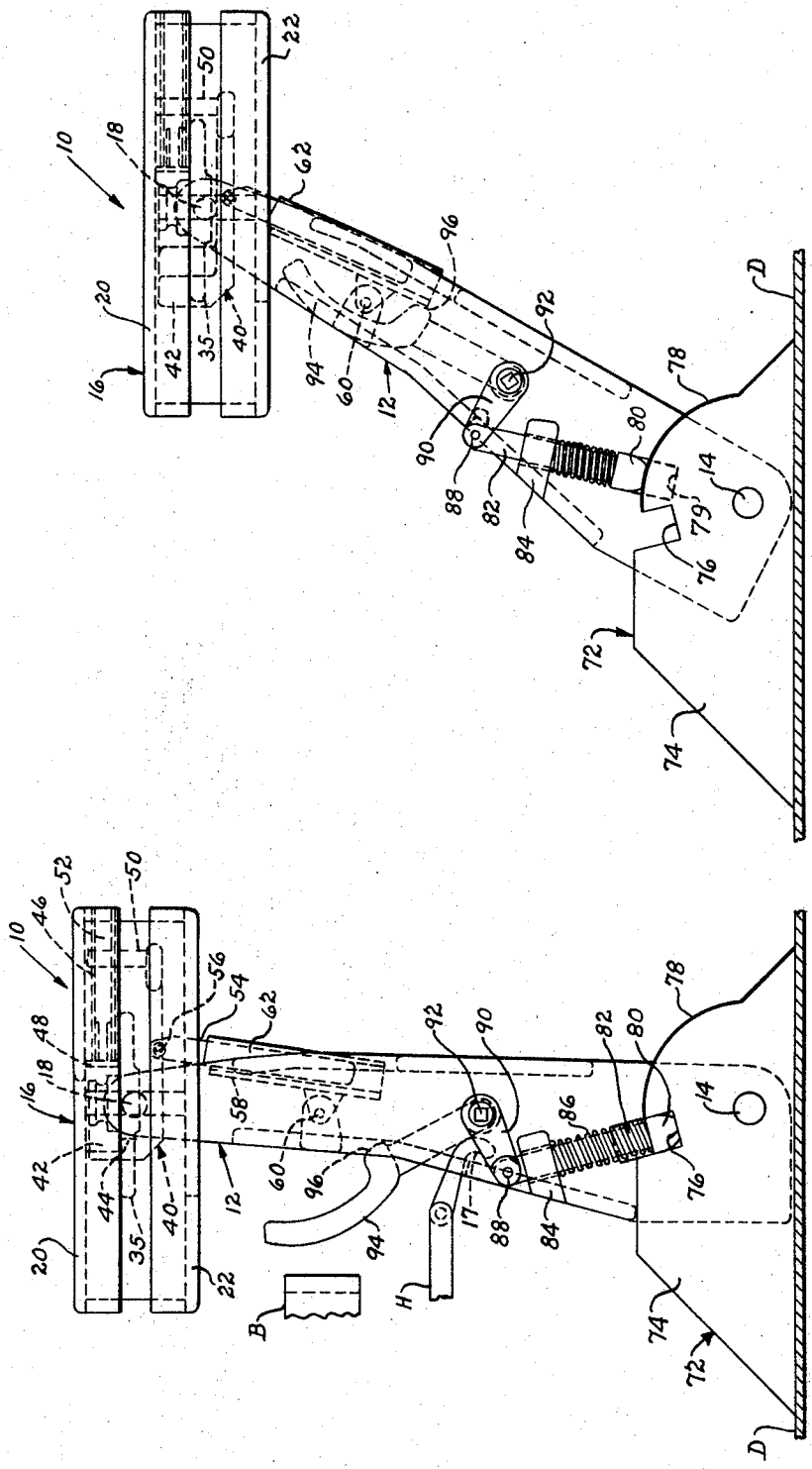

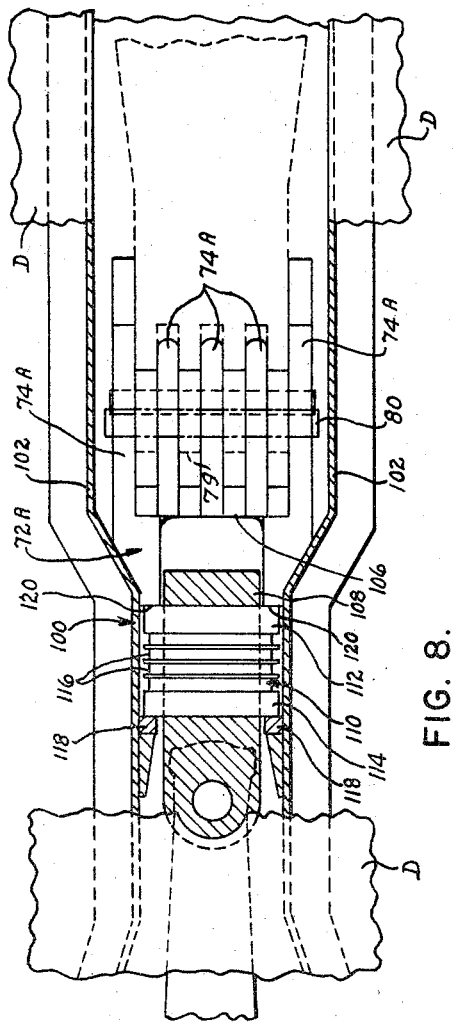
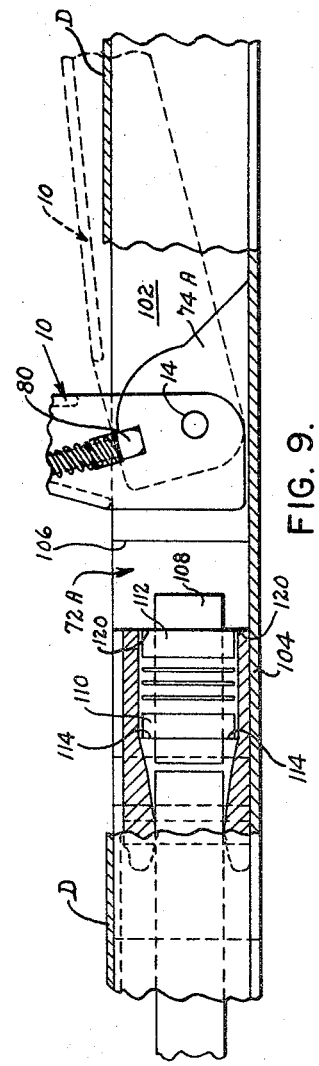
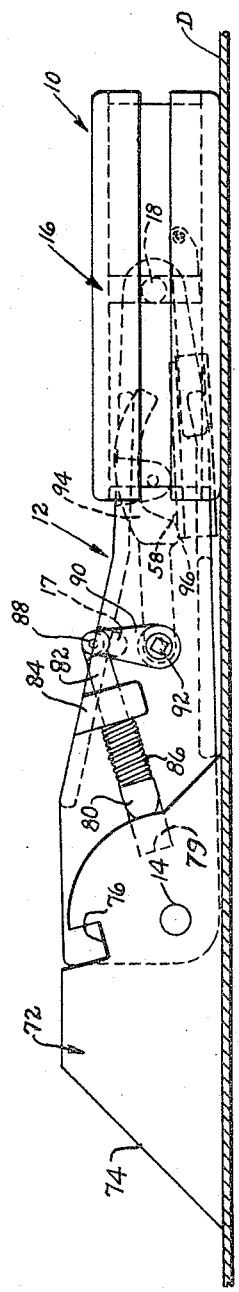

United States Patent Office 3,353,505
Patented Nov. 21, 1967

3,353,505
COLLAPSIBLE SUPPORT
Dallas W. Rollins, St. Charles, and Carl E. Becker, St. Louis, Mo., assignors to ACF Industries, Incorporated, New York, N.Y., a corporation of New Jersey
Filed Mar. 6, 1967, Ser. No. 633,321
7 Claims. (Cl. 105—368)

ABSTRACT OF THE DISCLOSURE

A collapsible tractor operated hitch mounted on a railway flat car and having a single vertical strut movable on a base support between erect and collapsed positions. Locking means carried by the single strut engage the base support when the strut is erected and the base support may be positioned below the deck of the car to form a rear stop for the draft gear of the railway car.

This application is a continuation-in-part of application Ser. No. 488,385 filed Sept. 20, 1965, and now abandoned.

Description of the invention

The present hitch comprises a single vertical strut or leg which is releasably locked in the erect position of the hitch. The use of a single strut simplifies the mounting of the collapsible hitch on the railway flat car and provides a minimum of parts. Further, in the collapsing of the hitch, only a single strut or leg is moved thereby to minimize any nesting or coaction of parts.

If the hitch is mounted adjacent an end of the railway car below the deck, the support for the hitch acts as a rear stop for the draft gear. The arrangement of the hitch support in such a manner permits the hitch to be mounted closely adjacent the end of the car as the space normally taken by the rear draft gear lugs may be utilized by the hitch support.

It is an object of the present invention to provide a hitch on a railway flat car for securing a trailer or the like for transport with the hitch having a single strut movable between erect and collapsed positions.

An additional object is the provision of such a collapsible hitch that is adapted to be erected and collapsed by a tractor and is adapted to be mounted below the deck of the railway flat car.

Another object is the provision of a support for a collapsible hitch which acts as a rear stop for the draft gear.

The invention accordingly comprises the constructions hereinafter described, the scope of the invention being indicated in the following claims.

In the accompanying drawings, in which the invention is illustrated,

FIGURE 4 is a side elevation of the hitch illustrated in FIGURES 2 and 3;

FIGURE 6 is a side elevation of the hitch shown in an unlatched position moving between collapsed and erect positions;

FIGURE 7 is a side elevation of the hitch shown in a collapsed position;

FIGURE 8 is a partial plan of the hitch shown in FIGURES 1–7 mounted below the deck of the railway car on a bottom cover plate of the fixed sill structure, certain parts being shown in section; and FIGURE 9 is a partial side elevation of the hitch of FIGURE 8 with certain parts broken away.

Corresponding reference characters indicate corresponding parts throughout the several views of the drawings.

Figure 1:
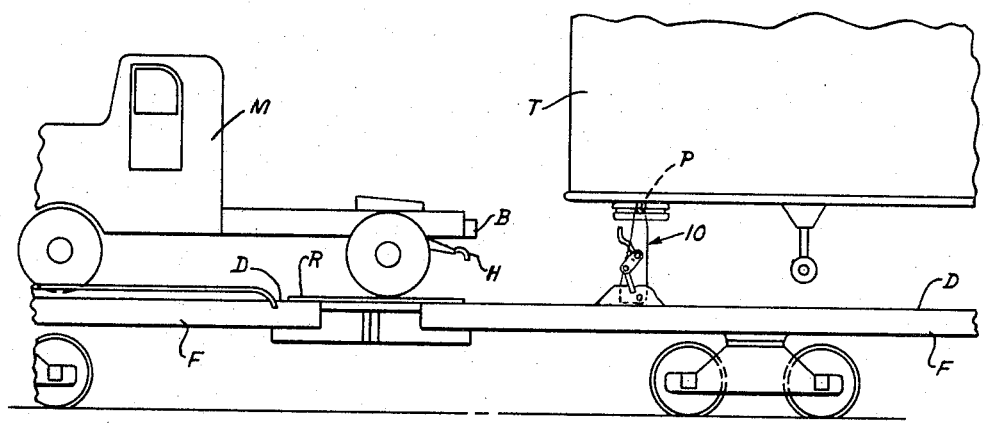
FIGURE 1 is a partial side elevation illustrating the hitch comprising the present invention mounted on a railway flat car and engaging the kingpin of a trailer, a tractor being shown for moving the hitch between collapsed and erect positions.

Referring to the drawings for a better understanding of the invention and more particularly to FIGURE 1, railway flat cars F are coupled to each other and have deck plates D spanned by bridge plates R. A tractor M is supported on bridge plates R when moving from one flat car to another and is adapted to transport a trailer T partially shown in FIGURE 1. A collapsible trailer hitch or support indicated generally at 10 is mounted adjacent an end of a flat car F and secures a kingpin P extending from the front end of trailer T to hold the associated trailer on the flat car.

Referring also to FIGURE 4, hitch 10 comprises a single vertical support or strut generally designated 12 pivotally connected adjacent its lower end about a horizontal pivot 14. A fifth wheel or mounting plate structure is generally designated 16 and is pivotally connected about horizontal pivot 18 to vertical support 12. Hitch 10 is adapted to be pulled from a collapsed position to an erect position upon forward movement of tractor M by a hook H on the rear of the tractor M engaging bar 17 as shown in FIGURE 4. A bumper block B attached to the rear of tractor M is adapted to knock hitch 10 to a collapsed position from erect position upon rearward movement of the tractor and thereby effect unlocking of trailer kingpin P and unlocking of vertical support 12 permitting collapsing of the hitch as will be explained more fully.

Mounting plate structure 16 comprising an upper plate 20 and a lower plate 22 having shear pads generally designated 24 secured between plates 20 and 22. As shown particularly in FIGURE 3, each shear pad 24 has a plurality of metal plates 26 separated by rubber blocks 28. Countersunk bolts 30 extend through plates 20 and 22 and are threaded into nuts 32 formed within each shear pad 24. A specific example of a preformed molded rubber shear pad which has been found to be satisfactory is sold under the trade name "LORD" by Lord Manufacturing Company, Erie, Pa.

Figure 5:
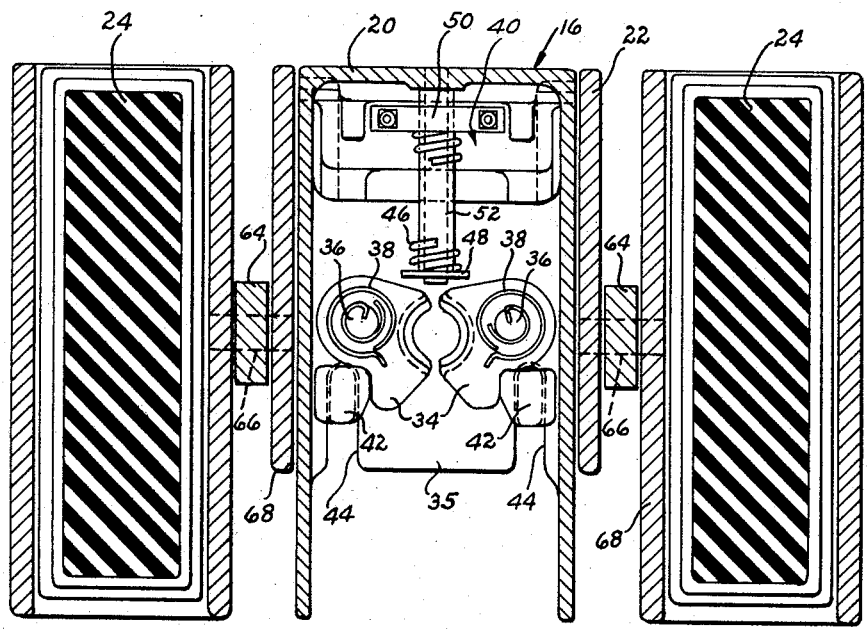
FIGURE 5 is a plan of the mounting plate structure with the upper plate removed and certain parts shown in section.
Figure 3:
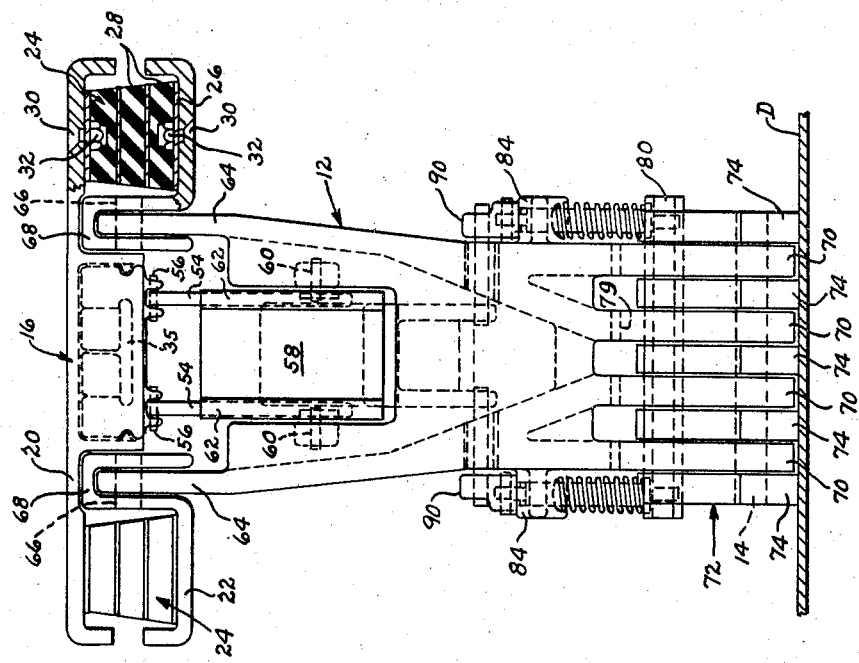
FIGURE 3 is a rear elevation of the hitch shown in FIGURE 2.
Figure 2:
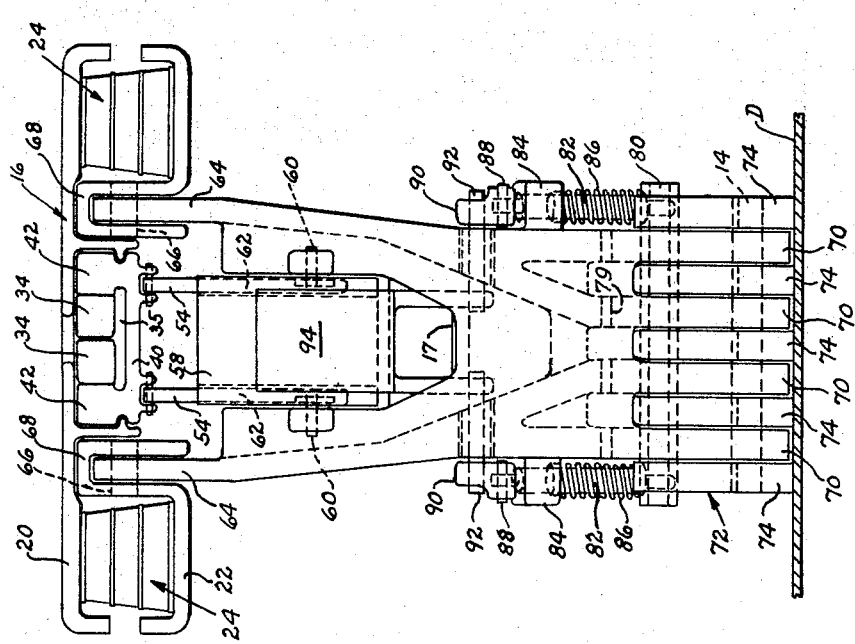
FIGURE 2 is a front elevation of the hitch shown in FIGURE 1 mounted on the deck of a railway car.

Jaws 34 are mounted for pivotal movement about pins 36 on a support 35 of upper plate 16 and are adapted to secure kingpin P of trailer T. Torsion springs 38 about pins 36 urge jaws 34 to an open position. For locking jaws 34, a slide 40 has upper projections 42 fitting in notches 44 of support 35 as shown in FIGURES 2, 3 and 5. Projections 42 engage jaws 34 to hold the jaws in closed position about a kingpin as shown in FIGURE 5. Slide 40 and projections 42 are continuously urged in a rearward direction to secure jaws 34 by spring 46 compressed between a stop 48 on support 35 and a bracket 50 on slide 40. Spring 46 telescopes a rod 52 secured to upper plate 20. To actuate slide 40 and referring particularly to FIGURES 2, 3, 4 and 6, arms 54 are pivotally mounted at 56 to the underside of slide 40. A plate 58 is pivotally mounted at 60 to vertical leg 12 and has a box shaped extension 62 on each side thereof to receive an associated arm 54 in telescoping relation thereby to permit free slippage between arms 54 and extensions 62. For further detail, reference is made to U.S. Patent No. 3,262,402 dated July 26, 1966, and entitled "Collapsible Hitch," the entire disclosure of which is incorporated by this reference.

Upon impact forces exerted against the railway car and trailer T, kingpin P exerts a force against jaws 34 and upper plate 20 to move upper plate 20 relative to lower plate 22 to cause a shearing displacement of shear pads 24 thereby absorbing the impact forces.

Vertical leg 12 has upper bifurcated leg portions 64 pivotally connected at 66 to channel-shaped sections 68 of lower plate 22. Extending from the lower end of vertical leg 12 are a plurality of lower leg portions or projections 70. A base support for vertical leg 12 is indicated generally at 72 and includes a plurality of upwardly extending projections 74 secured to deck plate D and receiving projections 70 therebetween. Pivot 14 comprises a pin connecting projections 70 and 74 for pivotal movement. Each projection 74 has an upwardly opening notch or recess 76 and an arcuate surface 78 adjacent one side of the notch. Each lower projection 70 has an opening 79 therein adapted to be in horizontal alignment with adjacent notches 76 when leg 12 is in erect position as shown in FIGURE 4.

Carried by leg 12 within openings 79 is a horizontally extending locking bar 80 adapted to fit in notches 76 in the erect position of leg 12 as shown in FIGURE 4. Secured adjacent each end of bar 80 is a rod 82 extending through a collar 84 on vertical leg 12. A spring 86 compressed between each collar 84 and locking bar 80 biases locking bar 80 in a downward direction. Pivotally mounted at 88 to each rod 82 is a link 90 having a shaft 92 fixed to shaft 92. A depressible push lever 94 is secured to shafts 92 for rotation of shafts 92 and actuation of locking bar 80. The upper portions of openings 79 extend vertically beyond arcuate surfaces 78 to permit bar 80 to be retracted from notches 76 and ride along surfaces 78 as shown in FIGURE 6. Extending rearwardly from lever 94 is a knob 96 adapted to contact plate 58 upon inward movement of lever 94.

In operation, for collapsing hitch 10, tractor M is moved rearwardly with bumper block B engaging lever 94 to rotate shafts 92 and lift locking bar 80 from notches 76. Substantially simultaneous with the removal of bar 80 from notches 76, knob 96 of push lever 94 engages plate 58 to move slide 40 in a forward direction against the bias of spring 46, thereby to remove extensions 42 from engagement with jaws 34. Kingpin P is then released with torsion springs 38 urging jaws 34 to an open position to allow vertical leg 12 to move to the collapsed position as shown in FIGURES 6 and 7.

In operation, trailer T is first positioned with kingpin P located forwardly of hitch 10. Then, bar 17 is engaged by hook H on tractor M and the tractor is moved forwardly to raise hitch 10 with locking bar 80 being received in notches 76. Hook H is then removed from bar 17 and trailer T is pushed rearwardly with kingpin P engaging and closing jaws 34 thereby permitting slide 40 to move rearwardly and engage jaws 34 in locked position as shown in FIGURE 5.

The arrangement of a plurality of interfitting projections 70 and 74 provides a plurality of shear surfaces between locking bar 80 and the adjacent edges of projections 74 on base support 72. Thus, a relatively large impact force may be adequately distributed by locking bar 80.

Referring to FIGURES 8 and 9, an arrangement is indicated in which hitch 10 is mounted below the deck plate D of the railway car. A fixed center sill structure indicated generally 100 includes a pair of spaced vertical webs 102 connected by a lower cover plate 104 and by deck plate D. Base support 72A is secured to lower cover plate 104 between vertical webs 102 and has a recess 106 as shown in FIGURE 8 to receive a yoke 108 for the draft gear indicated generally 110. Draft gear 110 includes a rear follower block 112 and a front follower block 114 having a plurality of rubber disks 116 therebetween. Front draft gear lugs 118 abut follower block 114. Rear follower block 112 abuts base support 72A as shown in FIGURE 8 with base support 72A acting as the rear draft lugs 120. Base support 72A has a plurality of extensions 74A and hitch 10 is mounted on base support 72A in a manner similar to the arrangement shown in FIGURES 1–7. Hitch 10 may be collapsed as shown in the dotted line arrangement of FIGURE 9.

Base support 72A is a casting and is easily formed with rear draft gear lugs 120 to provide rear stops for draft gear 110. The arrangement of hitch 10 below deck plate D of railway car F permits the hitch to be mounted closely adjacent the end of the car since the space normally required for draft gear lugs is now utilized by base support 72A. Thus, base support 72A is positioned closely adjacent the draft gear.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A collapsible hitch adapted to be erected and collapsed by a tractor comprising, a base support including a plurality of horizontally spaced upwardly extending projections, a single strut having a plurality of downwardly extending projections interfitting the upwardly extending projections and mounted on the base support for pivotal movement between a generally horizontal collapsed position and a generally vertical erect position, means carried by the extending end of the strut to engage the kingpin of a trailer or the like, a locking member mounted adjacent the lower end of the strut in the erect position thereof to releasably lock the strut in erect position to the base support, said upwardly extending projections being positioned adjacent said locking member and having notches therein alignable with said locking member in the erect position of the hitch to receive the locking member in locking engagement, means on said downwardly extending projections to receive said locking member and being defined by opposed surfaces positioned closely adjacent said locking member in the erect locked position of the hitch and adapted to contact said locking member for restricting movement of said single strut in erect position, and actuating means operatively connected to said locking member and adapted to be contacted by a tractor or the like for withdrawing said locking member from the notches in said projections to permit collapsing of the hitch.

2. A collapsible hitch comprising, a base support having a generally upwardly directed notch and a generally arcuate upper surface adjacent one side of said notch, a single strut mounted on the base support for pivotal movement between a generally horizontal collapsed position and an erect position, means carried by the extending end of the strut to engage the kingpin of a trailer or the like, an elongate locking bar carried by said strut adapted to ride along said arcuate upper surface and to be received in said notch when the strut is moved from a collapsed position to an erect position, means to urge the locking bar into engagement with said notch in the erect position of the hitch, means mounting said latch on said strut for movement between a latched position in which the locking bar is received within said notch and an unlatched position in which the locking bar is removed from said notch, and actuating means on the strut operatively connected to said locking bar and adapted to be contacted by a tractor or the like for withdrawing said locking bar from said notch to permit collapsing of the hitch.

3. A collapsible hitch as set forth in claim 2 wherein said base support includes a plurality of spaced, parallel extensions each having a notch and an adjacent arcuate upper surface.

4. A collapsible hitch as set forth in claim 2 wherein said means carried by the extending end of the strut comprises an upper support plate and a lower support plate with said lower support plate being pivotally connected to the extending end of the strut, a pair of locking jaws carried by the upper plate to releasably secure the kingpin of a trailer, and a resilient shear block secured between the upper and lower support plates permitting a generally horizontal cushioned movement of the upper support plate relative to the lower support plate and strut upon impact forces being exerted against the hitch.

5. A railway flat car having a fixed center sill structure extending the length thereof, said center sill structure including a pair of spaced vertical webs, a draft gear housed within the fixed center sill structure between the vertical webs, a hitch mounted on said railway flat car adjacent an end thereof and comprising a base support secured to the center sill structure, said base support abutting said draft gear and forming a rear stop for the draft gear, a strut mounted on the base support for pivotal movement between a generally horizontal collapsed position and an erect position, means carried by the extending end of the strut to engage the kingpin of a trailer or the like, and locking means mounted adjacent the lower end of the strut to releasably lock the strut to the base support in the erect position of the hitch.

6. A railway flat car having a fixed center sill structure extending the length thereof, said center sill structure including a pair of spaced vertical webs, a draft gear housed within the fixed center sill structure between the vertical webs, a hitch mounted adjacent an end of the railway car and comprising a base support secured to the center sill structure, said base support abutting said draft gear and forming a rear stop for the draft gear, a strut mounted on the base support for pivotal movement between a generally horizontal collapsed position and an erect position, means carried by the extending end of the strut to engage the kingpin of a trailer or the like, locking means mounted adjacent the lower end of the strut in the erect position thereof to releasably lock the strut in erect position to the base support, and actuating means projecting from the strut and operatively connected to said locking means, said actuating means being positioned in the path of travel of a tractor and moving inwardly upon contact of the tractor therewith to unlock the strut for collapsing of the hitch.

7. A railway car as set forth in claim 6 wherein said locking means comprises a locking bar carried by said strut and a notch in said base support to receive the bar in the erect position of the strut to lock the strut, said actuating means being operatively connected to said bar to withdraw said bar from said notch when engaged by a tractor or the like thereby to permit collapsing of the hitch.

References Cited

UNITED STATES PATENTS 2,916,238  12/1959  Fahland _____ 248—119

ARTHUR L. LA POINT, *Primary Examiner.*

DRAYTON HOFFMAN, *Examiner.*